United States Patent
Thomas et al.

[11] Patent Number: 5,806,502
[45] Date of Patent: Sep. 15, 1998

[54] FUEL HEATING SYSTEM FOR AN ENGINE

[76] Inventors: Edward C. Thomas, 34 Stevens Pl., Rocky Hill, Conn. 06067; Geoffrey P. Oles, 51 A Prospect St., Deep River, Conn. 06417

[21] Appl. No.: 907,653

[22] Filed: Aug. 8, 1997

[51] Int. Cl.⁶ .................................................. F02M 31/00
[52] U.S. Cl. .............................................................. 123/557
[58] Field of Search ................................. 123/557, 546, 123/552

[56] References Cited

U.S. PATENT DOCUMENTS

| | | |
|---|---|---|
| 2,080,182 | 5/1937 | Olivotti et al. . |
| 3,110,296 | 11/1963 | Lundi . |
| 3,209,816 | 10/1965 | McQuerry . |
| 3,253,647 | 5/1966 | Deshaies . |
| 3,929,187 | 12/1975 | Hurner . |
| 3,951,124 | 4/1976 | Fairbanks et al. . |
| 3,986,486 | 10/1976 | Rabbiosi . |
| 4,044,742 | 8/1977 | Linder . |
| 4,072,138 | 2/1978 | Hawkins et al. . |
| 4,083,340 | 4/1978 | Furr et al. . |
| 4,091,782 | 5/1978 | Dunnam . |
| 4,146,002 | 3/1979 | Quinn . |
| 4,180,036 | 12/1979 | Wolf . |
| 4,201,264 | 5/1980 | Platt . |
| 4,237,850 | 12/1980 | Connor et al. . |
| 4,286,551 | 9/1981 | Blitz . |
| 4,294,219 | 10/1981 | Rowe . |
| 4,326,491 | 4/1982 | Burchett . |
| 4,519,358 | 5/1985 | Redele ....................... 123/557 |
| 5,218,944 | 6/1993 | Leonard ..................... 123/557 |
| 5,662,090 | 9/1997 | Ward ......................... 123/557 |

*Primary Examiner*—Marguerite McMahon
*Attorney, Agent, or Firm*—Alix, Yale & Ristas, LLP

[57] ABSTRACT

A fuel heater for use with an engine having a liquid cooling system has an extractor and a heat exchanger. The extractor has a coolant diversion conduit defining a diversion across the coolant flow path and toward the upstream end. The extractor further has a coolant return conduit defining a return opening across the coolant flow path and oriented toward the downstream end. The heat exchanger forms a coolant jacket through which the fuel line is directed. Pipes conduct coolant between the extractor and the heat exchanger.

15 Claims, 4 Drawing Sheets

FUEL HEATING SYSTEM FOR AN ENGINE

FIELD OF THE INVENTION

This invention relates to the field of internal combustion engines.

More specifically, this invention relates to the heating of gasoline fuel for consumption by an internal combustion engine.

BACKGROUND OF INVENTION

It is known that the heating of gasoline fuel prior to consumption by an internal combustion engine can result in reductions in fuel consumption for improved mileage of motor vehicles, and/or the reduction in engine emissions including hydrocarbon output.

Prior fuel heating systems have employed the liquid coolant system of the internal combustion engine for heating the fuel. However, many prior systems have required substantial modifications to both the cooling system and the fuel delivery system in order to implement the fuel heating. These modifications can make these fuel heating systems inappropriate for retrofitting or installation to existing motor vehicles.

In addition, the size of the components of prior fuel heating systems and their requirement to be installed in particular positions can provide difficulties for retrofitting these systems to motor vehicles. Installation is problematical for motor vehicles having severe space restrictions such as front wheel drive automobiles.

Furthermore, prior fuel heating systems have failed to obtain the maximum benefits from the use of the engine liquid coolant due to heat losses and reduced flow rates of the coolant and/or the fuel to be heated. Prior fuel heating systems can require substantial modifications to fuel line placement, therefore reducing fuel pump efficiency and fuel flow rates. Furthermore, the modifications to the fuel line placement can result in increased risk of fuel spillage or leakage in the event of collision due to the extended arrangement of the fuel lines, or from the fuel line being exposed to excess vibration. Furthermore, prior fuel heating systems can restrict the cooling system flow rate and therefore effect the overall cooling capacity of the cooling system.

SUMMARY OF THE INVENTION

Briefly stated, the invention in a preferred form is a fuel heater for an internal combustion engine having a liquid cooling system. The fuel heater has an extractor inserted into the engine coolant system between the internal combustion engine and the radiator. The extractor efficiently diverts and returns liquid engine coolant from and to the engine coolant system. The fuel heater of the invention further has a heat exchanger positioned at a convenient location in the fuel line of the engine. A diversion pipe and a return pipe conduct engine coolant between the extractor and the heat exchanger.

The extractor has a preferably round cylindrical body having an outer diameter generally equivalent to the inside diameter of the radiator tube, typically a hose, to which the extractor is to be mounted. The extractor body defines a coolant flow path therethrough. A coolant diversion conduit and a coolant return conduit direct coolant to and from the coolant flow path in the extractor. The coolant diversion conduit extends through the extractor body and defines a diversion opening oriented toward the upstream direction for the diversion of hot coolant. The orientation of the diversion opening results in diversion of an increased quantity of heated coolant for redirection to the heat exchanger. The return conduit also extends through the extractor body and defines a return opening oriented toward the downstream direction of the coolant flow path. The orientation of the return opening can result in a suctioning action through the coolant return conduit thereby increasing coolant flow through the heat exchanger. The orientation of the diversion opening and return opening provides coolant flow generally sufficient to eliminate any requirement for an auxiliary coolant pump.

The coolant diversion conduit and coolant return conduit are preferably constructed such that one conduit is generally U-shaped and the other conduit is generally S-shaped. The result of these defined shapes is such that the diversion pipe and return pipe are oriented generally parallel to the radiator tube, thereby allowing for simplified installation of the extractor in restricted engine compartments. The extractor is further preferably constructed such that the coolant diversion conduit and coolant return conduit have generally the same diameter. Therefore, the extractor is universally configurable to be insertable into a radiator tube in either orientation. The diversion pipe and return pipe can therefore be parallel to the radiator tube in either longitudinal direction of the radiator tube. The diversion pipe and return pipe can extend in either the upstream or downstream direction of the radiator tube, therefore allowing for installation of a single universally configurable extractor in a greater number of vehicles.

The extractor does not result in a substantial restriction of coolant flow that would affect the cooling capacity of the engine cooling system. A portion of the coolant is merely diverted or redirected for fuel heating purposes. The coolant, after employment for heating the fuel, is returned to the cooling system whereby it may be further cooled by the radiator of the cooling system.

The diversion pipe directs the hot coolant from the coolant diversion conduit to the heat exchanger. The heat exchanger defines a coolant jacket through which the fuel line is directed. The fuel line is preferably composed of a high thermally conductive material, such as brass or copper, for the transfer of heat from the heated coolant to the incoming fuel. The heated fuel from the heat exchanger is then directed to the engine fuel regulator, such as a carburetor or fuel injection system. The used coolant is returned from the heat exchanger via the coolant return pipe to the extractor for return to the coolant flow path.

Coolant having a maximum temperature reaches the heat exchanger for improved heating of the fuel due to the improved diversion and return of engine coolant by the extractor. The increased temperature of the coolant directed at the heat exchanger therefore allows for use of the straight fuel line through the coolant jacket of the heat exchanger thereby resulting in minimal pressure drop of the fuel as a result of the use of the fuel heater. The fuel heater, therefore, preferably does not require coils or additional lengths of fuel line. Coils or additional fuel line can result in a substantial drop of fuel pressure that can affect engine performance.

The use of engine coolant for fuel heating provides for improved regulation of the heating of the fuel. The fuel heating is regulated by the engine coolant system, particularly the thermostat. The fuel will not be heated to greater than the maximum temperature of the cooling system, which is typically substantially below the boiling point of gasoline. In the event of complete coolant loss, the gasoline would merely fail to be heated, since no coolant would flow to the heat exchanger, therefore providing improved safety and substantially reducing the likelihood of fuel overheating.

An object of the invention is to provide a fuel heater that can be readily mounted in motor vehicles having compact engine compartments.

A further object of the invention is to provide a fuel heater that has improved diversion and return of engine coolant to and from the engine coolant system.

An additional object of the invention is to provide a fuel heater employing engine coolant for heating of the fuel.

These and other objects of the invention are apparent from a review of the specification and drawings.

DETAILED DESCRIPTION OF THE INVENTION

Figure 1:
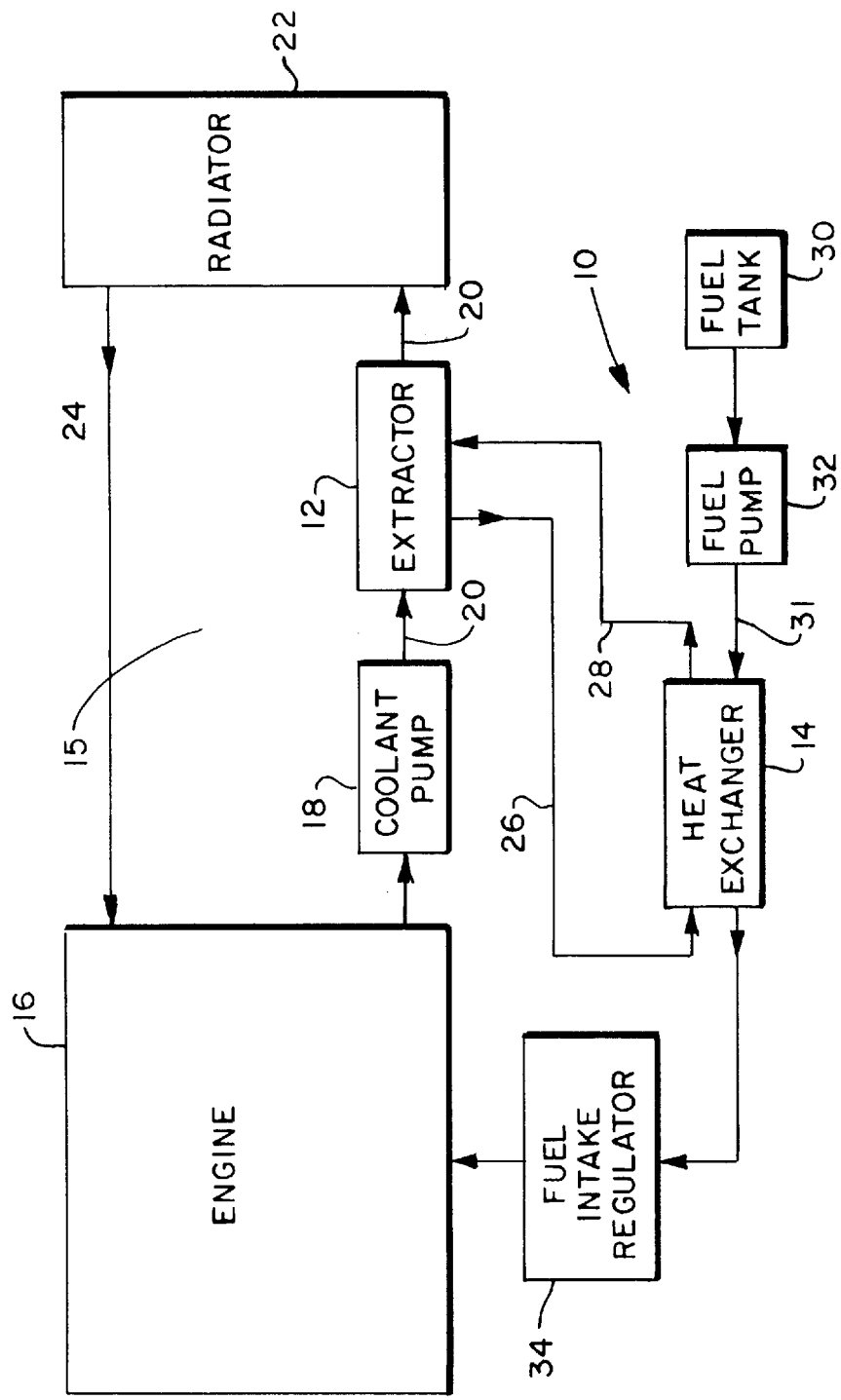
FIG. 1 is a schematic view of the fuel heater of the invention in combination with an internal combustion engine.

Like components are represented by like numerical identifiers throughout the figures. With reference to FIG. 1, a fuel heater 10 of the invention has an extractor 12 and a heat exchanger 14. The fuel heater 10 heats engine fuel, preferably gasoline, for reduced fuel consumption at a given power output and/or for reduced engine emissions. The heated fuel as a result of employment of the fuel heater exhibits improved vaporization and therefore improved burning characteristics during the ignition cycle of the engine. The extractor 12 is inserted into the engine coolant system 15 for an engine 16. The coolant system 15 employs a coolant pump 18 to circulate heated liquid coolant from the engine block 16 through a radiator tube 20. The extractor 12 is inserted or spliced into the radiator tube 20. The heated liquid coolant flows through the extractor 12 and then passes to a radiator 22 where it is cooled and returned to the engine 16 via a return radiator tube 24.

The extractor 12 can be positioned at either the intake or discharge side of the coolant pump 18. The extractor 12 is preferably positioned relative to the engine block such that the heated coolant passes through the extractor 12 prior to introduction to the radiator 22.

The extractor 12 is preferably positioned prior to the radiator 22 even if the coolant pump 18 is positioned on the discharge side of the radiator 22. The coolant pump 18 draws the heated coolant through the radiator 22, instead of pumping the heated coolant to the radiator 22 when positioned on the discharge side of the radiator 22.

Heated coolant diverted by the extractor 12 is directed via a coolant diversion pipe 26 to the heat exchanger 14. After having been directed to the heat exchanger 14, the coolant is returned by a coolant return pipe 28 to the extractor 12. The diversion and return pipes 26, 28 are preferably flexible hose for simplified positioning of the heat exchanger at convenient locations in differing motor vehicles.

The fuel to be heated is pumped from a fuel tank 30 by a fuel pump 32 via a fuel line 31. The heat exchanger 14 can be positioned in the fuel line 31 on either the intake or discharge side of the fuel pump 32. The heat exchanger 14, however, is preferably positioned as close as possible to a fuel intake regulator 34, to minimize fuel cooling. The fuel intake regulator 34 can be a carburetor or fuel injection system for regulation of fuel to the engine 16.

The extractor 12 has a cylindrical tubular extractor body 36. The extractor body 36 defines a coolant flow path A therethrough. The extractor 12 thereby has an upstream end 38 and a downstream end 40. In typical installations the radiator tube 20 will be a plastic or rubber hose. The outer diameter of the extractor body 36 is therefore preferably the same as the inner diameter of the radiator tube 20 for simplified installation. The fuel heater 10 can be retrofit to a motor vehicle by installation of the extractor 12 into the preexisting radiator tube 20. The radiator tube 20 can be transversely split and the extractor 12 inserted into the resulting openings. The extractor body 36 is preferably flared at the openings for improved sealing when employed with a flexible radiator tube 20. The radiator tube 20 is maintained on the extractor body 36 by hose clamps (not shown).

Figure 2:
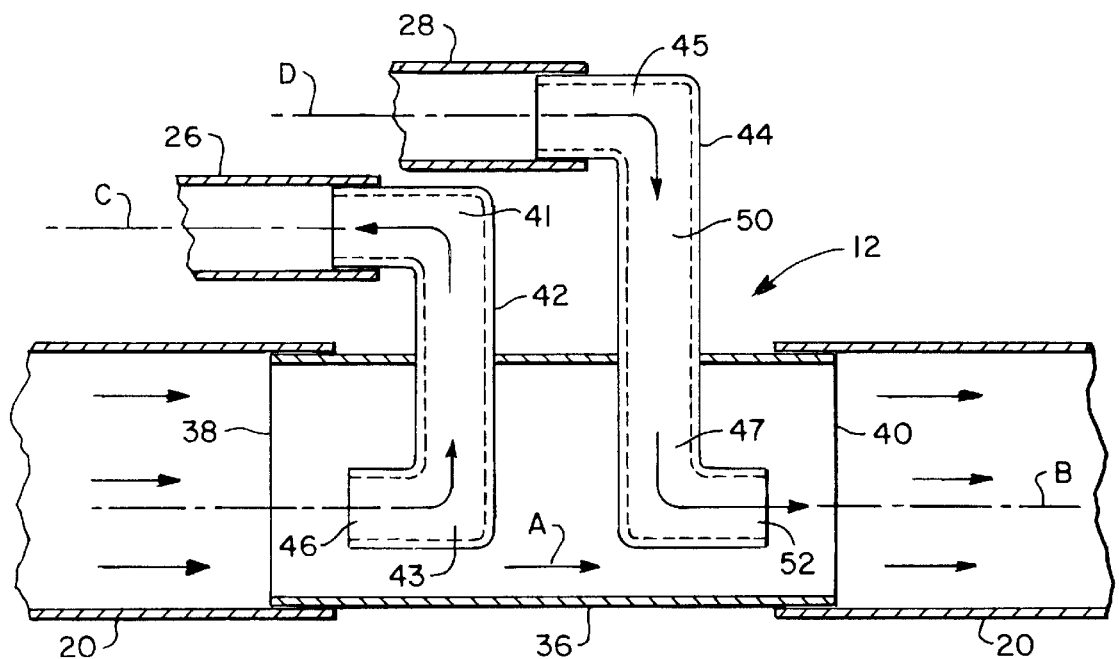
FIG. 2 is a partial cross-sectional right side view of the extractor, radiator tube, coolant diversion pipe and coolant return pipe of FIG. 1.
Figure 3:
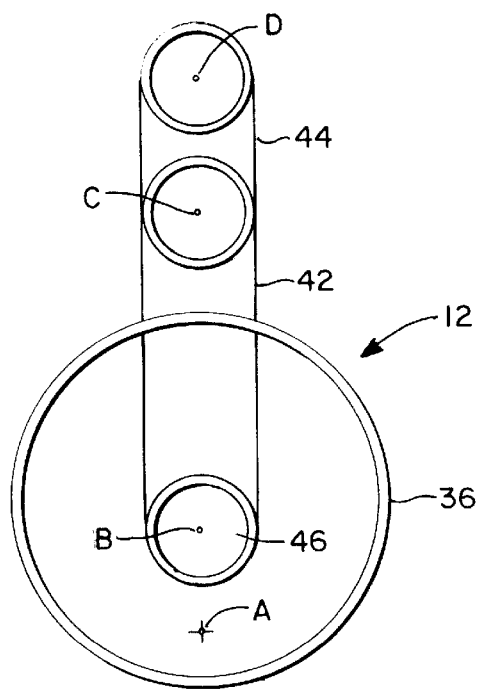
FIG. 3 is an end-on view of the extractor of FIG. 2 viewed from the left thereof.

A coolant diversion conduit 42 and a coolant return conduit 44 extend into the coolant flow path A. (See FIGS. 2 and 3) The coolant diversion conduit 42 defines a diversion opening 46 oriented generally across or perpendicular the coolant flow path A and further oriented toward the upstream end 38. The coolant diversion conduit 42 forms a coolant diversion passage 48 through the extractor body 36 from the coolant flow path A to the coolant diversion pipe 26. The orientation of the diversion opening 46 across the coolant flow path A allows for increased redirection of heated coolant to the heat exchanger 14 for fuel heating.

Coolant returning from the heat exchanger 14 by the coolant return pipe 28 is directed by the coolant return conduit 44 back into the coolant flow path A. The coolant return conduit 44 defines a coolant return passage 50 through the extractor body 36. The coolant return conduit 44 further defines a return opening 52 oriented across or generally perpendicular to the coolant flow path A and further oriented toward the downstream end 40 The flow of the main coolant flow stream A past the return opening 52 can result in a suction effect, whereby the coolant from the coolant return passage 50 is drawn into the main coolant flow path A, thereby improving the total flow of coolant to the heat exchanger 14.

The coolant diversion conduit 42 has a diversion conduit outer portion 41 on the exterior of the extractor body 36 and a diversion conduit inner portion 43 on the interior of the extractor 36. Similarly, the coolant return conduit 44 has a return conduit outer portion 45 on the exterior of the extractor body 36 and a return conduit inner portion 47 on the interior of the extractor body 36. The inner portions 43, 47 preferably define longitudinally aligned or co-linear diversion and return openings 46, 52. The diversion and return openings thereby define an opening axis B parallel to the coolant flow path A. In addition, the outer portions 41, 45 each preferably define a diverter axis C and a return axis D respectively. The diversion and return axes C, D and flow path A are all preferably mutually parallel, and furthermore, diverter and return axes C, D, and preferably opening axis B are coplanar to result in an extractor 12 having a reduced profile for improved use in motor vehicles having severe space constraints.

The coolant diversion conduit 42 and coolant return conduit 44 are further shaped such that one conduit preferably forms a generally U-shape and the other conduit preferably forms a generally S-shape. The U-shaped and S-shaped conduits 42, 44 orient the coolant diversion pipe 26 and coolant return pipe 28 parallel to the radiator tube 20. The positioning of the coolant return pipe 28 and coolant diversion pipe 26 parallel to the radiator hose 20 improves and simplifies positioning of the extractor 12 in engine compartments having severe space restraints. Furthermore, the coolant diversion conduit 42 and coolant return conduit 44 have preferably the same diameter, such that the extractor 12 is reversibly positionable in the radiator tube 20. Therefore, the coolant diversion pipe 26 and coolant return pipe 28 extend parallel to the radiator tube 20 in either the upstream or the downstream direction depending on the orientation of the extractor 14. The universal configurability or orientation of the extractor 14, allowing the coolant diversion and return pipes 26, 28 to be oriented in either direction parallel to the radiator tube 20, allows for a greater variety of positionings of the extractor 12 in a coolant system 15. The improved diversion and return of coolant from and to the main coolant flow path A will be substantially the same in either orientation of the extractor 12. The diversion conduit outer portion 41 and return conduit outer portion 45 are preferably flared for improved sealing when employed with coolant diversion pipes 26 and coolant return pipes 28 formed of flexible hose.

Figure 4:
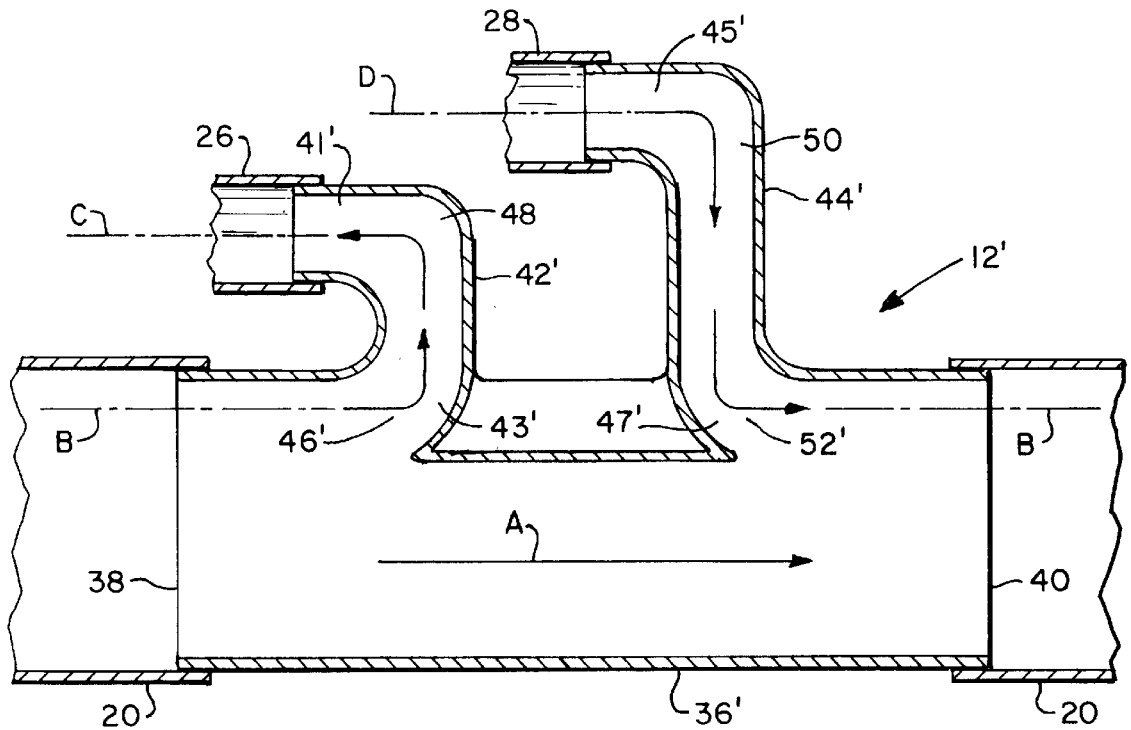
FIG. 4 is a partial cross-sectional right side view of an alternate embodiment of the extractor, radiator tube, coolant diversion pipe and coolant return pipe.
Figure 5:
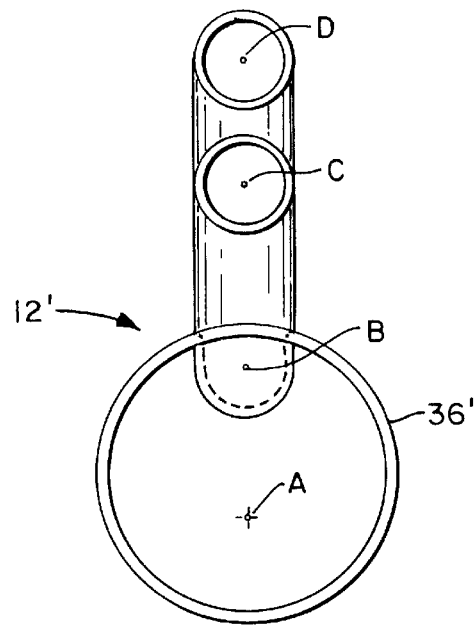
FIG. 5 is an end-on view of the extractor of FIG. 4 viewed from the left thereof.
Figure 6:
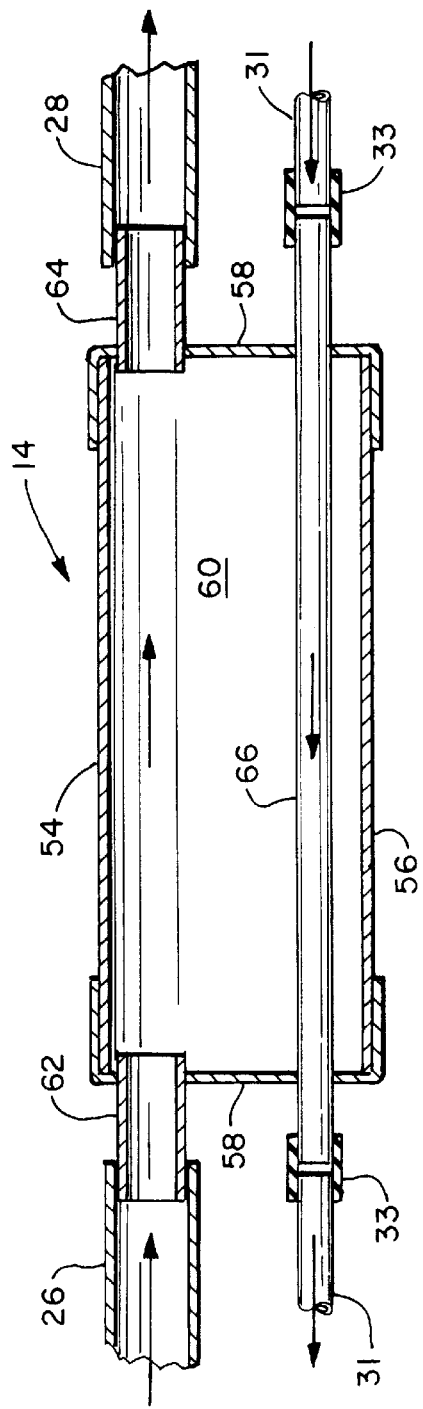
FIG. 6 is a partial cross-sectional side view, of the heat exchanger, coolant diversion pipe and coolant return pipe of FIG. 1.
Figure 7:
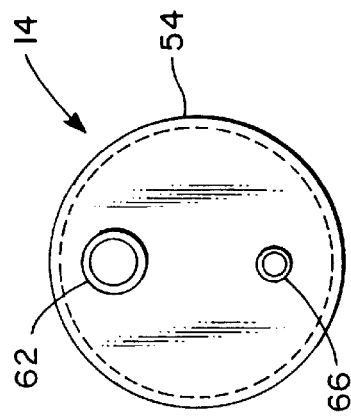
FIG. 7 is an end-on view of the heat exchanger of FIG. 6 viewed from the left thereof.

In an alternative embodiment of the extractor 12', the coolant diversion conduit 42' and coolant return conduit 44' are integrally molded into the extractor body 36'. (See FIGS. 4 and 5) The extractor 12' is preferably formed of an injection-molded heat-resistant plastic for reduced cost of manufacture. The diversion opening 46' and return opening 52' are positioned adjacent the wall of the extractor body 36' for simplified manufacture. The positioning of the openings 46', 52' adjacent the wall of the extractor body 36' maintains an improved extraction and return of coolant for improved movement of coolant to and from the heat exchanger 14. The extractor 12' also has preferably co-linear diversion openings 46' and return openings 52' defined by respective diversion conduit inner portions 41 and return inner portions 47' respectively. In addition, a diversion conduit outer portion 41' and a return conduit outer portion 45' define parallel respective diversion and return axes C, D. The diversion and return axes C, D are preferably parallel to the coolant flow path A and further mutually coplanar. The opening axis B is preferably also mutually parallel and coplanar with diversion and return axes C, D.

The heat exchanger 14 has a heat exchanger body 54 formed of a cylindrical body portion 56 and end caps 58. The cylindrical body portion 56 and end caps 58 define a coolant jacket 60 therein. The coolant diversion pipe 26 is mounted to an exchanger coolant inlet 62 and the coolant return pipe 28 is mounted to an exchanger coolant outlet 64 by hose clamps (not shown). The exchanger coolant inlet 62 and exchanger coolant outlet 64 are preferably flared for improved sealing when employed with coolant return pipes 28 and coolant diversion pipes 26 formed of flexible hose. The heated coolant flows through the coolant jacket 60 from the exchanger coolant inlet 62 to the exchanger coolant outlet 64. An exchanger fuel line 66 passes through the coolant jacket 60 for heating of the fuel passing therethrough. The exchanger fuel line 66 can, when the heat exchanger 14 is retro-fit to an engine, be spliced into the fuel line 31 with hose segments 33 and hose clamps (not shown). The end portions of the fuel line 66 can be flared to improved sealing with the hose segments 33. The exchanger fuel line 66 is preferably composed of a highly thermally conductive material, such as brass or copper, for efficient transfer of heat from the liquid coolant to the liquid fuel. The improved diversion and return of the coolant by the extractor 12 results in coolant of the highest potential temperature entering the coolant jacket 60. The fuel line 66 can be generally straight due to the improved coolant diversion and return. Coils of fuel line or other increases in the fuel line length that could result in a drop of fuel pressure are therefore not required for typical installations due to the improved fuel heating as a result of the increased coolant temperature in the heat exchanger 12. Coils or other well-known methods of improved heat transfer to the exchanger fuel line 66 can be employed within the coolant jacket 60 to obtain improved fuel heating for engines having increased fuel flow requirements.

The separation of the extractor 12 and the heat exchanger 14 allows for positioning of the fuel heater 10 in a larger variety of vehicles. The extractor 12 is constructed to provide minimal interference with components near the radiator tube 20 and the heat exchanger 14 can be positioned in many locations for increased flexibility in installation. The heat exchanger 14 is preferably positioned such that substantial rerouting of the fuel line 31 is not required. However, the heat exchanger 14 can be readily positioned in other locations in the engine compartment having additional space if so required. The heat exchanger 14 is preferably mounted to the structure of the vehicle such that it is substantially free of engine vibration.

While the preferred embodiments of the present invention has been illustrated and described in detail, it should be readily appreciated that many modifications and changes thereto are within the ability of those of ordinary skill in the art. Therefore, the appended claims are intended to cover any and all of such modifications which fall within the true spirit and scope of the invention.

What is claimed is:

1. A fuel heater for an internal combustion engine using a fuel and having a liquid coolant system comprising:

a coolant extractor having a tubular extractor body defining a coolant flow path therethrough, a coolant diversion conduit defining a diversion opening oriented across a portion of said coolant flow path and further a diversion fluid passage through said extractor body, and a coolant return conduit defining a return opening oriented across a portion of said flow path and further a return fluid passage through said extractor body;

heat exchanger means for exchanging heat between engine coolant and fuel and having an exchanger coolant inlet, an exchanger coolant outlet, a fuel inlet and a fuel outlet;

a coolant diversion pipe defining a fluid passage between said coolant diversion conduit of said coolant extractor and said coolant inlet of said heat exchanger means; and a coolant return pipe defining a fluid passage between said coolant outlet of said heat exchanger means and said coolant return conduit of said coolant extractor.

2. The fuel heater of claim 1 wherein said diversion opening and said return opening are co-linear.

3. The fuel heater of claim 1 wherein said extractor body is cylindrical.

4. The fuel heater of claim 1 wherein one of said diversion conduit and said return conduit is generally U-shaped and the other of said diversion conduit and said return conduit is generally S-shaped.

5. The fuel heater of claim 1 wherein said heat exchanger has an outer wall and an inner wall within said outer wall, said inner wall and outer wall defining a coolant jacket therebetween.

6. A fuel heater for an internal combustion engine using a fuel and having a liquid coolant system comprising:

a coolant extractor having a cylindrical tubular body having a wall defining a body interior and a body exterior and defining a coolant flow path having an upstream end and an opposite downstream end, a coolant diversion conduit defining a diversion opening positioned in said body interior and oriented across said flow path and oriented toward said upstream end and forming a diversion fluid path between said body interior and said body exterior, and a coolant return conduit defining a return opening positioned in said body interior and oriented across said flow path and toward said downstream end and forming a return fluid path between said body interior and said body exterior;

a heat exchanger having a tubular fuel line having a fuel inlet, a fuel outlet and a fuel flow path therebetween and a coolant jacket defining a coolant fluid chamber adjacent said fuel line, said fuel line forming a heat conductive surface between said fluid chamber and said fuel flow path, said coolant jacket having an exchanger coolant inlet and an exchanger coolant outlet;

a coolant diversion pipe defining an uptake fluid path between said coolant diversion conduit of said extractor and said exchanger coolant inlet; and a coolant return pipe defining a return fluid path between said exchanger coolant outlet and said coolant return conduit of said extractor.

7. The fuel heater of claim 6 wherein said fuel line is straight.

8. The fuel heater of claim 6 wherein one of said coolant diversion conduit and said coolant return conduit is generally U-shaped and said other of said coolant diversion conduit and said coolant return conduit is generally S-shaped.

9. The fuel heater of claim 6 wherein said diversion opening and said return opening are co-linear.

10. The fuel heater of claim 6 wherein said coolant diversion conduit, said coolant return conduit and said extractor body are integrally molded.

11. The fuel heater of claim 10 wherein said extractor body, said coolant diversion conduit and said coolant return conduit are plastic.

12. The fuel heater of claim 6 wherein said coolant diversion pipe and said coolant return pipe are each flexible hoses.

13. The fuel heater of claim 6 wherein said coolant diversion conduit has a diversion conduit outer portion on said body exterior and defining a diversion axis and said coolant return conduit has a return conduit portion on said body exterior defining a return axis, said diversion axis and said return axis being parallel.

14. The fuel heater of claim 13 wherein said diversion axis and said return axis are parallel to said coolant flow path.

15. The fuel heater of claim 14 wherein said diversion opening and said return are co-linear and define an opening axis parallel and in the same plane with said diversion axis and said return axis.

* * * * *